United States Patent
Lee et al.

(10) Patent No.: US 7,343,444 B2
(45) Date of Patent: *Mar. 11, 2008

(54) RECONFIGURABLE MEMORY MODULE AND METHOD

(75) Inventors: Terry R. Lee, Boise, ID (US); Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,175

(22) Filed: Sep. 15, 2006

(65) Prior Publication Data

US 2007/0011392 A1    Jan. 11, 2007

Related U.S. Application Data

(63) Continuation of application No. 10/601,104, filed on Jun. 19, 2003, now Pat. No. 7,120,727.

(51) Int. Cl.
*G06F 12/06* (2006.01)
(52) U.S. Cl. ......................................... 711/5
(58) Field of Classification Search ............ None
See application file for complete search history.

(56) References Cited

U.S. PATENT DOCUMENTS

| | | | |
|---|---|---|---|
| 5,133,059 A | 7/1992 | Ziegler et al. | 395/425 |
| 6,157,962 A | 12/2000 | Hodges et al. | 710/1 |
| 6,233,376 B1* | 5/2001 | Updegrove | 385/14 |
| 6,252,821 B1 | 6/2001 | Nizar et al. | 365/238.6 |
| 6,467,013 B1 | 10/2002 | Nizar | 711/1 |
| 6,502,161 B1* | 12/2002 | Perego et al. | 711/5 |
| 6,788,104 B2* | 9/2004 | Singh et al. | 326/39 |
| 6,889,304 B2* | 5/2005 | Perego et al. | 711/170 |
| 2002/0120709 A1 | 8/2002 | Chow et al. | 709/213 |
| 2003/0014578 A1* | 1/2003 | Pax | 710/100 |
| 2003/0043426 A1* | 3/2003 | Baker et al. | 359/109 |
| 2003/0156639 A1 | 8/2003 | Liang | 375/240.01 |
| 2003/0223295 A1* | 12/2003 | Ozguz et al. | 365/201 |
| 2004/0049649 A1 | 3/2004 | Durrant | 711/165 |
| 2004/0268061 A1 | 12/2004 | Khare et al. | 711/151 |
| 2005/0078506 A1 | 4/2005 | Rao et al. | 365/154 |
| 2005/0105350 A1 | 5/2005 | Zimmerman | 365/201 |
| 2006/0288172 A1 | 12/2006 | Lee et al. | 711/137 |
| 2007/0033353 A1 | 2/2007 | Jeddeloh | 711/154 |

FOREIGN PATENT DOCUMENTS

WO    WO 98/57489    12/1998

* cited by examiner

*Primary Examiner*—Hyung Sough
*Assistant Examiner*—Craig E Walter
(74) *Attorney, Agent, or Firm*—Dorsey & Whitney LLP

(57) ABSTRACT

A computer system includes a controller coupled to a plurality of memory modules each of which includes a memory hub and a plurality of memory devices divided into a plurality of ranks. The memory hub is operable to configure the memory module to simultaneously address any number of ranks to operate in a high bandwidth mode, a high memory depth mode, or any combination of such modes.

21 Claims, 4 Drawing Sheets

PHYSICAL MEMORY MAP

RECONFIGURABLE MEMORY MODULE AND METHOD

CROSS REFERENCE TO RELATED TO APPLICATION

This application is a continuation of pending U.S. patent application Ser. No.10/601,104, filed Jun. 19, 2003, now U.S. Pat. No. 7,120,727.

This invention relates to memory systems, and, more particularly, to a memory module that may be configured to a variety of data formats.

BACKGROUND OF THE INVENTION

Computer systems use memory devices, such as dynamic random access memory ("DRAM") devices, to store instructions and data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

A memory system 10 typically used in a computer system is shown in FIG. 1. The memory system 10 includes a memory controller 14 coupled to several memory modules 20a, b . . . n through a bus system 24. The bus system 24 typically includes an address bus 26 a command bus 28 and a bi-directional data bus 30. However, other conventional memory systems may use bus systems 24 having other configurations, such as a combined address bus 26 and command bus 28. In any case, each of the memory modules 20 includes several memory devices 34, such as DRAM devices, mounted on an insulative substrate 36. Conductive leads 38 are fabricated on the substrate 36 to couple the memory devices 34 to the buses 26-30. The conductive leads 38 typically couple the memory devices 34 to all of the buses 26-30 in parallel, although some of the lines in the command bus 28, such as chip select lines, may be coupled to the memory devices 34 in fewer than all of the memory modules 20.

In operation, the memory controller 14 applies row and column addresses through the address bus 26 and command signals to the command bus 28 to read data from or write data to the memory devices 34. In the event of a write memory access, there are also coupled from the memory controller 14 to the memory devices 34. In the event of a read memory access, data are coupled from the memory devices 34 to the memory controller 14. Although address, command and write data signals are applied to the memory devices 34 and all of the memory modules 20, a chip select signal or other similar signal selects the memory devices 34 on only one of the memory modules 20 for the memory access.

The memory modules 20 shown in FIG. 1 are normally configured for a particular data format. For example, sixteen memory devices 34 may be included in the memory module 20, and each memory device 34 may couple a single bit of data to and from the memory controller 14. In such case, each of the memory modules 20 will input and output data in 16-bit words. Alternatively, the memory devices 34 may be divided into two groups or "ranks" each of which are individually accessed by, for example, being enabled by separate chip select signals. In such case, if each memory device 34 couples a single bit of data to and from the memory controller 14, the memory module 20 will output data in 8-bit bytes. By way of further example, the memory devices 34 on each memory module may be individually accessed, and each memory device 34 may couple 8 bits of data to and from the memory controller 14. In such case, each memory module 20 will output data in 8-bit bytes. Other data formats used in conventional memory systems will be apparent to one skilled in the art.

The selection of a data format controls not only the size of the data word coupled to and from each memory module 20, but it also controls the effective size of the memory that may be addressed in each module 20. More specifically, assume each memory module 20 includes eight memory devices 34 each of which has an 8-bit data bus and one million addressable locations. Each memory device 34 thus has a capacity of 1 MB so that the total size of the memory module 20 is 8 MB. Each of the memory devices 34 may be individually addressed to interface with an 8-bit data bus so that there are 8 million addresses in the address space. Alternatively, all of the memory devices 34 may be simultaneously addressed to interface with a 64-bit data bus so that there are 1 million addresses in the address space. The memory devices 34 may also be operated in two ranks to interface with a 32-bit data bus with an address space of 4 million addresses. In all of these cases, the total memory capacity of the memory module 20 is 8 MB. However, in each of these cases the data bandwidth, i.e., the rate at which data bits are coupled through the data bus, and the number of memory addresses, i.e., the depth of the memory module 20, vary. The memory bandwidth and memory depth are thus trade-offs of each other.

In conventional memory systems, the memory bandwidth and memory depth are selected based the bandwidth and depth desired for a specific application. For example, a first data format may be used for a system in which maximizing bandwidth is important, such as a memory system used in a video graphics card. However, a second data format may be used in a system in which maximizing memory depth is important, such as in a database system. Unfortunately, the memory system must be optimized for either high memory bandwidth, high memory depth or a combination of bandwidth and depth. The memory system is optimized by selecting appropriate memory devices 34 for inclusion in the memory module 20 and selecting a configuration for the bus structure 24 and conductive leads 38 formed on the substrate 36. Insofar as the data format selected is determined by the hardware design, is not possible to easily alter the data format. Instead, different memory modules must be used, a different motherboard in which the memory modules are normally inserted must be used, and a different memory controller must be used. Therefore, the data format is normally a fixed data format optimized for a particular application, even though the memory system may be called upon to operate in another application in which a different data format would be optimal. In such cases, the memory system cannot provide optimum performance.

There is therefore a need for a memory system that can have a variety of data formats each of which can be optimized to a specific application.

SUMMARY OF THE INVENTION

A memory system that can be used in a computer system includes a controller operable to receive a memory request and to transmit a corresponding memory request to an input/output port. The memory system also includes a plurality of memory modules, each which includes a memory hub and a plurality of memory devices arranged in a plurality of ranks. The memory hub in each memory module is programmable to configure the memory module in a plurality of data formats each corresponding to a respective number of ranks of memory devices that are simultaneously accessed. The memory hubs in each of the memory modules may be programmed for the same or for different data formats. The memory hub in each memory module receives a memory request at an input/output port and couples a corresponding memory request to the memory device in each of the ranks that the memory hub has been programmed to access. When programmed for a high bandwidth, the memory hub simultaneously accesses the memory devices in all of the ranks. When programmed for a high memory depth, the memory hub accesses the memory devices in only one of the ranks at a time.

DETAILED DESCRIPTION OF THE INVENTION

Figure 1:
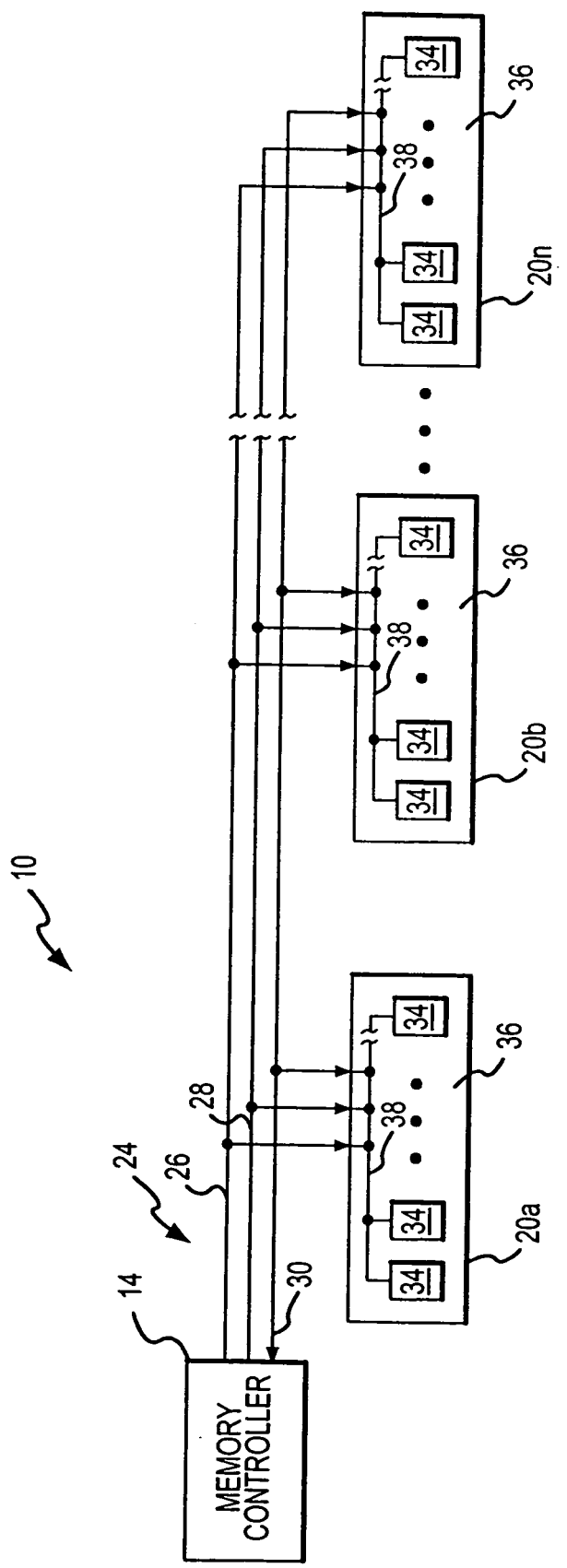
FIG. 1 is a block diagram of a conventional memory system containing several memory modules.
Figure 2:
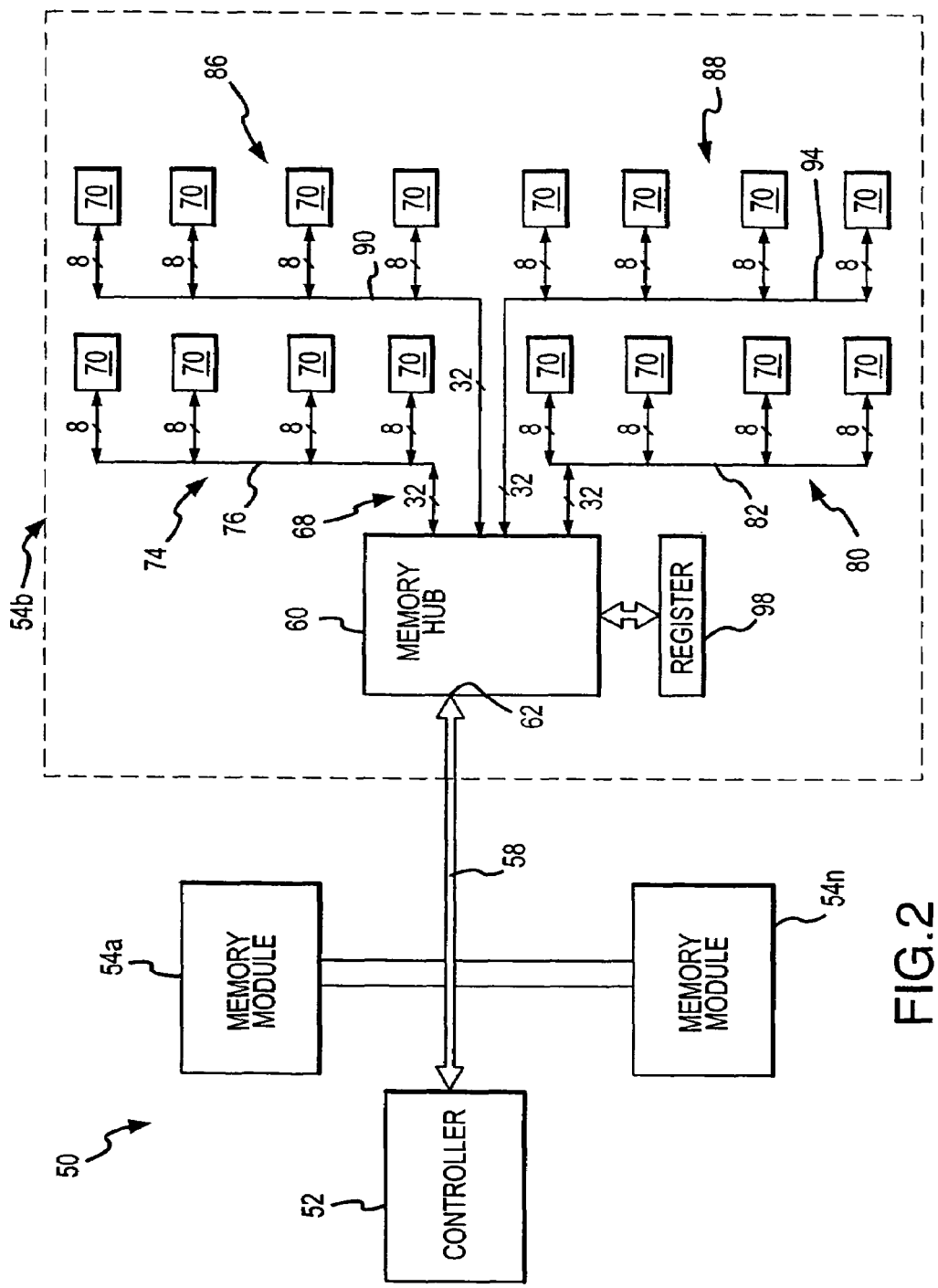
FIG. 2 is a block diagram of a memory system according to one example of the invention in which a controller is coupled to several memory modules each of which contains a reconfigurable memory hub coupled to several memory devices.

A memory system 50 according to one example of the invention is shown in FIG. 2. The memory system 50 includes a controller 52 coupled to several memory modules 54 a, b . . . n through a high-speed link 58. The controller 52 may be coupled to a memory access device, such as a processor (not shown), or it may be, for example, itself a processor. The high-speed link 58 may be a bus formed by multiple conductors, an optical communication link, and RF communication link, or some other type of high-speed communication link. Typically, the high-speed link 58 will have a capacity for coupling data having a predetermined bus width between the controller 52 and each memory module 54. In the example shown in FIG. 2, the link 58 couples a 32-bit data word. The high-speed link 58 also couples address and command signals from the controller 52 to the memory modules 54. Although the high-speed link 58 is shown in FIG. 2 as having a multi-drop topology in which the link 58 is coupled to several memory modules 54a, b . . . n, other topologies may be used, including a point-two-point topology in which each of several links is coupled to a respective one of the memory modules 54a, b . . . n. A switching topology in which the high-speed bus 58 is selectively switched to each of the memory modules 54a, b . . . n or some other topology may also be used.

Each of the memory modules 54 includes a memory hub 60 having an input/output port 62 coupled to the high-speed link 58 and a bus system 68 coupled to several memory devices 70. The memory devices 70 may be, for example, dynamic random access memory devices ("DRAMs") or some other type of memory devices. In the example shown in FIG. 2, the memory devices 70 are divided into four groups or "ranks" coupled to the memory hub 60 through a respective bus system. More particularly, a first rank 74 includes four memory devices 70 coupled to the memory hub 60 through a first bus system 76 having a 32-bit data bus. A second rank 80 containing four memory devices 70 are coupled to the memory hub 60 through a second bus system 82 having a 32-bit data bus. Similarly, third and fourth ranks 86, 88 are each coupled to the memory hub 60 through respective bus systems 90, 94 each having a 32-bit data bus. In the example shown in FIG. 2, each of the memory devices 70 have an 8-bit data bus so that the four memory devices 70 together provide 32 bits for the 32-bit data buses of the bus systems 76, 82, 90, 94. The bus systems 76, 82, 90, 94 also includes address and command buses coupling the memory hub 60 to the memory devices 70.

In operation, a non-volatile register 98 in the memory module 54 is programmed to configure the memory hub 60 depending upon whether a high memory bandwidth or a high memory depth is desired. For example, for a high memory bandwidth, the memory hub 60 addresses all of the memory devices 70 simultaneously so that 128 bits of data are written to or read from the memory devices 70 each memory access. If each memory device 70 stores 8 MB of data, for example, there will only be 1 million addresses in the memory system 50 in the high bandwidth mode. The 128 bits of data can be coupled through the high-speed link 58 by either increasing the speed of the link 58 or the size of the data word coupled through the link 58. For example, in the high-speed mode, a 128-bit data word may be coupled through the link 58. Therefore, for every memory access, 128 data bits will be coupled through the link 58. Alternatively, the link 58 may transfer only a 32-bit data word, but it may operate at four times the speed of the memory devices 70. Thus, for example, if the memory devices 70 operate at a rate of 500 MB/sec, the high-speed link 58 may couple data at a rate of 2 GB/sec. Other alternatives are also possible. For example, the high-speed link 58 may couple 64-bit data words at a rate of 1 GB/sec.

In the high memory depth mode, only one rank 74, 80, 86, 88 may be addressed at a time. In this mode, only 32 bits of data will be coupled to or from the memory module 54 with each memory access in contrast to the 128 bits of data coupled in the high bandwidth mode. However, since only one rank 74, 80, 86, 88 is addressed at a time, there will be 4 million addresses in the memory system 50, assuming that each memory device 70 stores 8 MB of data. Thus, in this mode, the address space is 4 times deeper than the address space in the high bandwidth mode. In the high memory depth mode, the high-speed link 58 can operate at a slower data rate than in the high bandwidth mode.

The memory hub 60 can also configure the memory module 54 to operate in a medium bandwidth, medium depth mode in which one pair of ranks 74, 80 are simultaneously accessed and the other pair of ranks 86, 88 are simultaneously accessed. In this mode, 64 bits of data are coupled through the high-speed link 58 with each memory access.

By allowing the memory hub 60 to configure the data format of the memory module 54, the data format can be optimized for a particular application being executed in a computer system or other electronic system containing the memory system 50. For example, when executing a graphics intensive application like a video game, the memory system 50 can be configured in the high bandwidth mode. When a computer system is executing a database application, for example, the memory system 50 can be configured in the high memory depth mode. The data format is therefore not fixed as in conventional memory systems.

Figure 3:
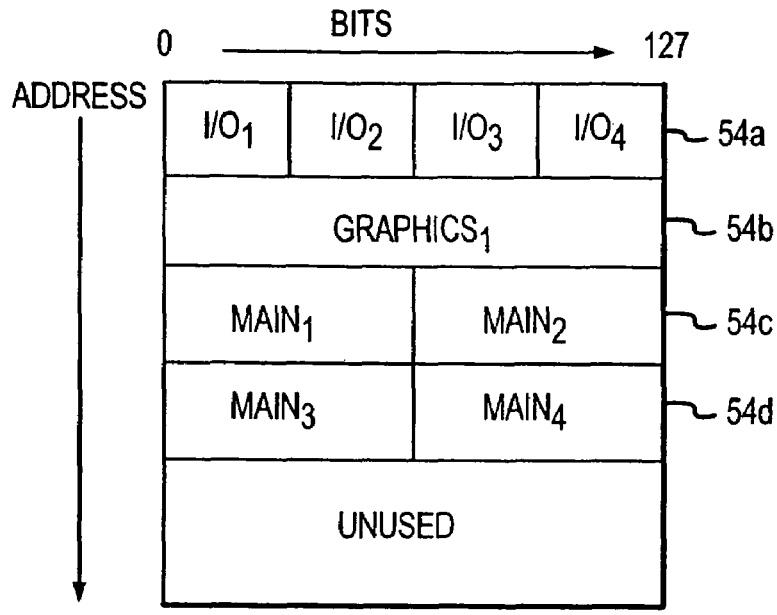
FIG. 3 is a memory map showing the use of the address space provided by the memory system of FIG. 2.

Although all of the memory modules 54a, b ... n may be configured to operate using the same data format, different memory modules 54a, b ... n may be configured to operate using different data formats at the same time. For example, with reference to the memory map shown in FIG. 3, the first memory module 54a is configured in the high memory depth mode optimized for performing input/output functions. In this mode, 32 data bits are coupled through the high-speed link 58 with each memory access. Therefore, the first memory module 54a would be used for input/output functions by the application being executed in a computer system containing the memory system 50. The second memory module 54b is configured in the high bandwidth mode so that it can handle graphics processing in an optimum manner. In this mode, 128 data bits are coupled through the high-speed link 58 with each memory access. An application being executed by a computer system containing the memory system 50 might therefore access the second memory module 54b with a graphics processor (not shown). The third an fourth memory modules 54c, d are configured in the medium bandwidth mode optimized to serve as system main memory for a computer system. In this mode, 64 data bits are coupled through the high-speed link 58 with each memory access. By configuring each memory module 54 with a different data format, an application being executed can operate in an optimum manner even though it requires different data formats to do so. Furthermore, the manner in which the different memory modules 54 are configured can change depending upon the nature of the application being executed by a computer system containing the memory system 50. For example, the memory system 50 may be configured from using its address space as shown in the memory map shown in FIG. 3 to a configuration in which the first two memory modules 54a, b are configured for the high bandwidth mode and the second two memory modules 54c, d are configured for the high memory depth mode.

Figure 4:
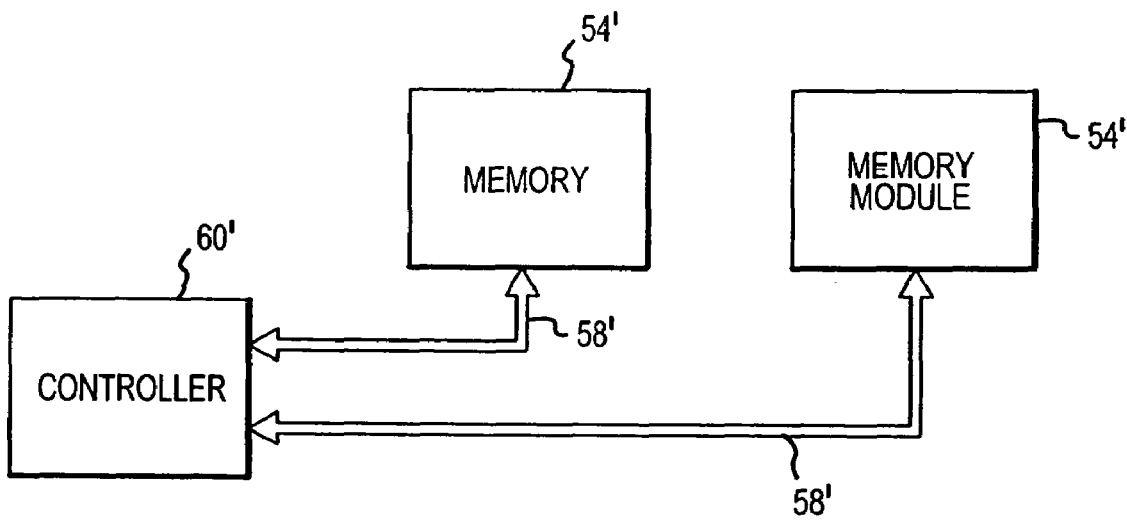
FIG. 4 is a block diagram of a memory system according to another example of the invention.

As previously mentioned, the controller 60 is coupled to the memory modules 54 through the high-speed link 58 using a multi-drop topography. However, a controller 60' may be coupled to several memory modules 54' using the topology shown in FIG. 4 in which a separate high-speed link 58' is coupled to each memory module 54'. This topography further increases the memory bandwidth because data may be coupled to the controller 60' through each of the high-speed links 58' in the maximum memory bandwidth format.

Figure 5:
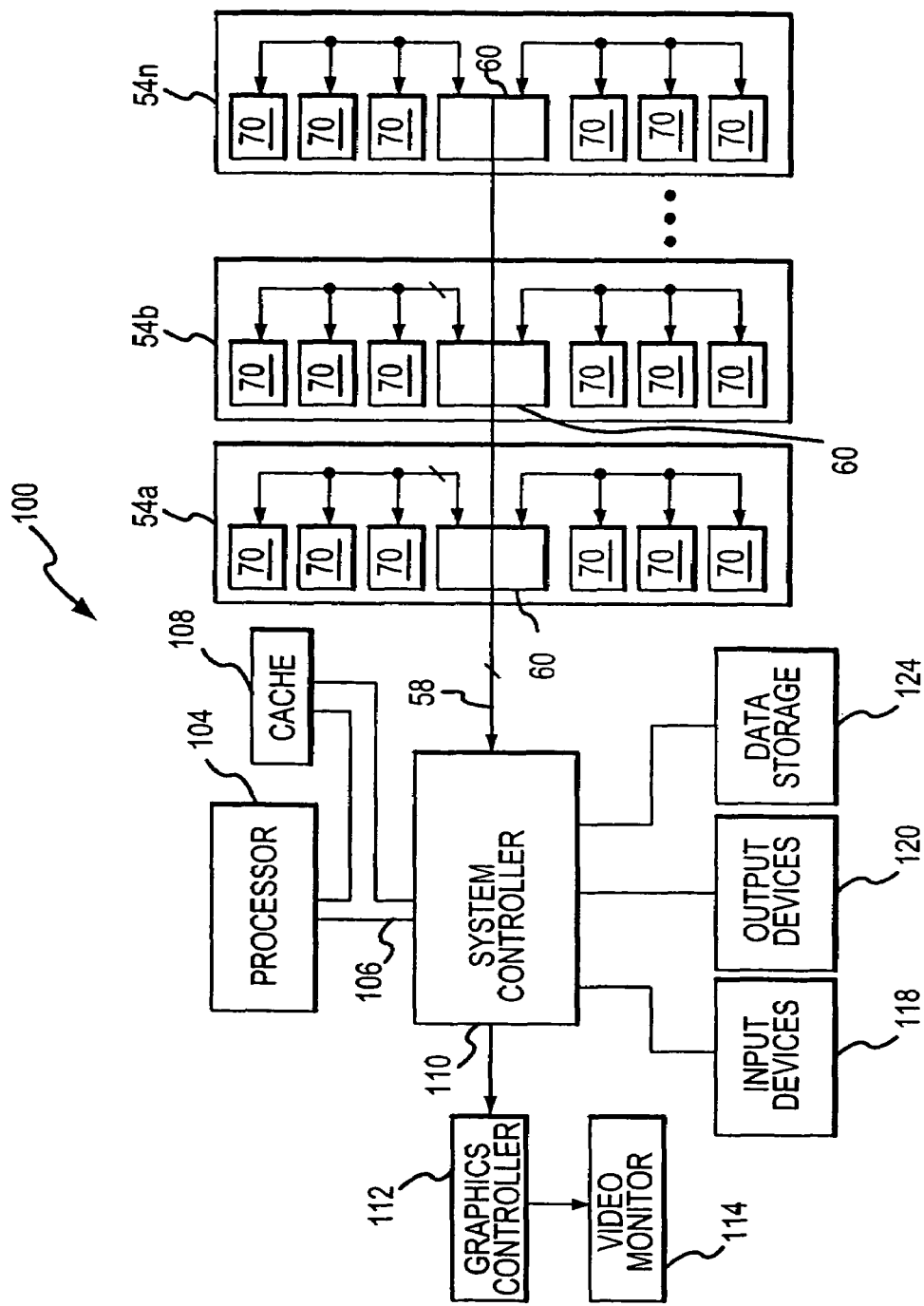
FIG. 5 is a block diagram of a computer system using the memory system of FIG. 2.

A computer system 100 using the memory system 50 shown in FIG. 2 is shown in FIG. 5. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video monitor 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several of the memory modules 54a, b ... n through the high-speed link 58. The processor 194 accesses some of the memory modules 54 in the computer system 100 in a data format optimized for use as main memory. One of the memory modules 54 is directly accessed by the graphics controller 112, and this memory module is configured in the high bandwidth mode, as previously explained.

Although the computer system 100 uses the system controller 110 to generate memory requests that are coupled to the memory modules 54, other components that are either part of or separate from the system controller 110 may instead be used.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory system, comprising:
a controller operable to receive a memory request and to transmit a corresponding memory request to an input/output port;
a plurality of memory modules, each of the memory modules comprising:
a plurality of memory devices arranged in a plurality of ranks; and
a memory hub operable to receive a memory request at an input/output port, the memory hub being coupled to the memory devices in each of the ranks, the memory hub being programmable to configure the memory module containing the memory hub in one of a plurality of modes;
wherein the memory hub in a first of the memory modules is programmed such that the programming configures the first memory module so that all of the ranks of memory devices in the first memory module simultaneously respond to being addressed, the memory hub in a second of the memory modules is programmed such that the programming configures the second memory module so that half and only half of the ranks of memory devices in the second memory module simultaneously respond to being addressed, and the memory hub in a third of the memory modules is programmed such that the programming configures the third memory module so that each of the ranks of memory devices in the third memory module individually respond to being addressed; and a communications link coupling the input/output port of the controller to the input/output ports of the memory hubs in the respective memory modules.

2. The memory system of claim 1 wherein the memory hub in each of the memory modules is coupled to the memory devices in each of the ranks through respective busses.

3. The memory system of claim 1, further comprising a programmable storage device coupled to the memory hub, the programmable storage device being programmed to control the operating mode of the memory hub.

4. The memory system of claim 1 wherein the memory devices in each rank are collectively operable to read or write N-bit data words, and wherein the memory hub further comprises an input/output port that is operable to receive or transmit M*N-bit data words, where M is the number of ranks of memory devices in the memory module.

5. The memory system of claim 1 wherein the memory devices in each rank are collectively operable to read or write N-bit data words in a first period of time, and wherein the memory hub further comprises an input/output port that is operable to receive or transmit M*N data bits in the first period of time, where M is the number of ranks of memory devices in the memory module.

6. The memory system of claim 5 wherein the memory devices are operable to read or write data at a rate of X bits per second, and wherein the input/output port comprises an N-bit input/output port that is operable to transmit or receive N-bit data words at a rate of M*X data words per second.

7. The memory system of claim 5 wherein the memory devices are operable to read or write data at a rate of X bits per second, and wherein the input/output port comprises a 2*N-bit input/output port that is operable to transmit or receive 2*N-bit data words at a rate of M*X/2 data words per second.

8. The memory system of claim 5 wherein the memory devices are operable to read or write data at a rate of X bits per second, and wherein the input/output port comprises a M*N-bit input/output port that is operable to transmit or receive M*N-bit data words at a rate of X data words per second.

9. The memory system of claim 1 wherein the memory devices comprise dynamic random access memory devices.

10. The memory system of claim 9 wherein the dynamic random access memory devices comprise synchronous dynamic random access memory devices.

11. The memory system of claim 1 wherein the input/output port of the controller and the input/output port of each of the memory hubs comprises an optical input/output port, and wherein the communications link comprises an optical communications link.

12. A computer system, comprising:
a central processing unit ("CPU");
a system controller coupled to the CPU, the system controller being operable to receive a memory request from the central processing unit and to transmit a corresponding memory request to an input/output port;
an input device coupled to the CPU through the system controller;
an output device coupled to the CPU through the system controller;
a storage device coupled to the CPU through the system controller;
a plurality of memory modules, each of the memory modules comprising:
a plurality of memory devices arranged in a plurality of ranks; and
a memory hub operable to receive a memory request at an input/output port, the memory hub being coupled to the memory devices in each of the ranks, the memory hub being programmable to configure the memory module containing the memory hub in one of a plurality of modes;
wherein the memory hub in a first of the memory modules is programmed such that the programming configures the first memory module so that all of the ranks of memory devices in the first memory module simultaneously respond to being addressed, the memory hub in a second of the memory modules is programmed such that the programming configures the second memory module so that half and only half of the ranks of memory devices in the second memory module simultaneously respond to being addressed, and the memory hub in a third of the memory modules is programmed such that the programming configures the third memory module so that each of the ranks of memory devices in the third memory module individually respond to being addressed; and
a communications link coupling the input/output port of the system controller to the input/output ports of the memory hubs in the respective memory modules.

13. The computer system of claim 12 wherein the memory hub in each of the memory modules is coupled to the memory devices in each of the ranks through respective busses.

14. The computer system of claim 12 further comprising a programmable storage device coupled to the memory hub, the programmable storage device being programmed to control the operating mode of the memory hub.

15. The computer system of claim 12 wherein the memory devices in each rank are collectively operable to read or write N-bit data words, and wherein the memory hub further comprises an input/output port that is operable to receive or transmit M*N-bit data words, where M is the number of ranks of memory devices in the memory module.

16. The computer system of claim 12 wherein the memory devices in each rank are collectively operable to read or write N-bit data words in a first period of time, and wherein the memory hub further comprises an input/output port that is operable to receive or transmit M*N data bits in the first period of time, where M is the number of ranks of memory devices in the memory module.

17. The computer system of claim 16 wherein the memory devices are operable to read or write data at a rate of X bits per second, and wherein the input/output port comprises an N-bit input/output port that is operable to transmit or receive N-bit data words at a rate of M*X data words per second.

18. The computer system of claim 16 wherein the memory devices are operable to read or write data at a rate of X bits per second, and wherein the input/output port comprises a 2*N-bit input/output port that is operable to transmit or receive 2*N-bit data words at a rate of M*X/2 data words per second.

19. The computer system of claim 16 wherein the memory devices are operable to read or write data at a rate of X bits per second, and wherein the input/output port comprises a M*N-bit input/output port that is operable to transmit or receive M*N-bit data words at a rate of X data words per second.

20. The computer system of claim 12 wherein the memory devices comprise dynamic random access memory devices.

21. The computer system of claim 20 wherein the dynamic random access memory devices comprise synchronous dynamic random access memory devices.

* * * * *

UNITED STATES PATENT AND TRADEMARK OFFICE
CERTIFICATE OF CORRECTION

PATENT NO.       : 7,343,444 B2                                    Page 1 of 1
APPLICATION NO.  : 11/522175
DATED            : March 11, 2008
INVENTOR(S)      : Lee et al.

It is certified that error appears in the above-identified patent and that said Letters Patent is hereby corrected as shown below:

In column 1, line 7, before "U.S." delete "pending".

Signed and Sealed this

Tenth Day of June, 2008

JON W. DUDAS
*Director of the United States Patent and Trademark Office*